US 7,945,927 B2

(12) United States Patent
Jun et al.

(10) Patent No.: US 7,945,927 B2
(45) Date of Patent: May 17, 2011

(54) MULTIPLE ITEM USER PREFERENCE INFORMATION DATA STRUCTURE AND METHOD FOR PROVIDING MULTI-MEDIA INFORMATION

(75) Inventors: Sung Bae Jun, Seoul (KR); Kyoung Ro Yoon, Seoul (KR)

(73) Assignee: LG Electronics, Inc., Seoul (KR)

( * ) Notice: Subject to any disclaimer, the term of this patent is extended or adjusted under 35 U.S.C. 154(b) by 625 days.

(21) Appl. No.: 11/399,544

(22) Filed: Apr. 6, 2006

(65) Prior Publication Data
US 2006/0179455 A1    Aug. 10, 2006

Related U.S. Application Data

(63) Continuation of application No. 09/665,941, filed on Sep. 21, 2000, now Pat. No. 7,296,285.

(30) Foreign Application Priority Data

Sep. 22, 1999    (KR) .................................. 41192/1999

(51) Int. Cl.
*H04H 60/33*    (2008.01)
*H04H 60/32*    (2008.01)
*H04N 7/173*    (2006.01)
*H04N 5/445*    (2006.01)
*G06F 3/00*    (2006.01)
*G06F 13/00*    (2006.01)

(52) U.S. Cl. ................... 725/46; 725/9; 725/13; 725/16; 725/24; 725/45

(58) Field of Classification Search ............... 725/37, 725/44, 46
See application file for complete search history.

(56) References Cited

U.S. PATENT DOCUMENTS

| 5,410,344 | A | * | 4/1995 | Graves et al. ............... 725/46 |
| 5,465,113 | A | | 11/1995 | Gilboy |
| 5,469,206 | A | | 11/1995 | Strubbe et al. |
| 5,749,081 | A | | 5/1998 | Whiteis |
| 5,754,939 | A | | 5/1998 | Herz et al. |
| 5,758,257 | A | * | 5/1998 | Herz et al. ................... 725/46 |
| 5,758,259 | A | | 5/1998 | Lawler |

(Continued)

FOREIGN PATENT DOCUMENTS

| EP | 0 854 645 | 7/1988 |
| EP | 0 749 081 | 12/1996 |
| GB | 2 325 537 | 11/1998 |
| JP | 11-205706 | 7/1999 |

OTHER PUBLICATIONS

Japanese Office Action for Japanese Application No. 2000-289146, 5 pages.

(Continued)

*Primary Examiner* — Christopher Kelley
*Assistant Examiner* — Randy Flynn
(74) *Attorney, Agent, or Firm* — Sidley Austin LLP

(57) ABSTRACT

A user preference information data structure which is capable of classifying and setting user's preference information regarding multi-media contents with multiple items to thereby provide users with user's request-based whole or partial multi-media information, and a method for providing multi-media information by using the user preference information data structure. The multiple item user preference information data structure for multi-media contents comprising: single item user preference information for single items related to the multi-media information; and multiple items user preference information for multiple items formed by combining the single items.

21 Claims, 3 Drawing Sheets

| | ITEM IDENTIFIERS | PREFERENCE/NON-PREFERENCE LEVEL |
|---|---|---|
| | | NON-PREFERENCE ← → PREFERENCE |
| | | -4 \| -3 \| -2 \| -1 \| 0 \| 1 \| 2 \| 3 \| 4 |
| SINGLE ITEM | DIRECTOR A | |
| | DIRECTOR B | |
| | GENRE A | |
| | GENRE B | |
| | ACTOR A | |
| | ACTOR B | |
| MULTIPLE ITEM | DIRECTOR A, GENRE A | |
| | DIRECTOR A, GENRE B | |
| | DIRECTOR B, GENRE A | |
| | DIRECTOR B, ACTOR B | |
| | GENRE B, ACTOR A | |
| | GENRE B, ACTOR B | |
| | DIRECTOR A, GENRE A, ACTOR A | |
| | DIRECTOR A, GENRE B, ACTOR A | |

U.S. PATENT DOCUMENTS

| | | | |
|---|---|---|---|
| 5,798,785 A | 8/1998 | Hendricks et al. | |
| 5,893,091 A | 4/1999 | Hunt et al. | |
| 5,913,013 A | 6/1999 | Abecassis | |
| 6,005,597 A | 12/1999 | Barrett et al. | |
| 6,493,688 B1 * | 12/2002 | Das et al. | 725/116 |
| 2002/0199194 A1 | 12/2002 | Ali | |

OTHER PUBLICATIONS

Masami Shishibori et al., "A Filtering Method for Mail Documents Using Personal Profiles," The Institute of Electronics, Information and Communication Engineers (IEICE), Tokyo, Japan, 1998, pp. 9-18.

* cited by examiner

FIG. 1
CONVENTIONAL ART

ITEM IDENTIFIERS / PREFERENCE/NON-PREFERENCE LEVEL

| | NON-PREFERENCE | | | | | | | | PREFERENCE |
|---|---|---|---|---|---|---|---|---|---|
| | -4 | -3 | -2 | -1 | 0 | 1 | 2 | 3 | 4 |
| DIRECTOR A | | ▨ | | | | | | | |
| DIRECTOR B | | | | | | | | | ▨ |
| DIRECTOR C | | | | | | | | ▨ | |
| GENRE A | | | | | | | | | ▨ |
| GENRE B | | | | | | | ▨ | | |
| GENRE C | ▨ | | | | | | | | |
| GENRE D | | | | | ▨ | | | | |
| ACTOR A | | | | | | | | | ▨ |
| ACTOR B | | | | | | | | | ▨ |
| ACTOR C | ▨ | | | | | | | | |
| PLAYER A | | | | | | | | | ▨ |
| PLAYER B | | ▨ | | | | | | | |
| PLAYER C | | | | | | | | ▨ | |
| TEAM A | | | | | | | | | ▨ |
| TEAM B | ▨ | | | | | | | | |
| ⋮ | | | | | ⋮ | | | | |

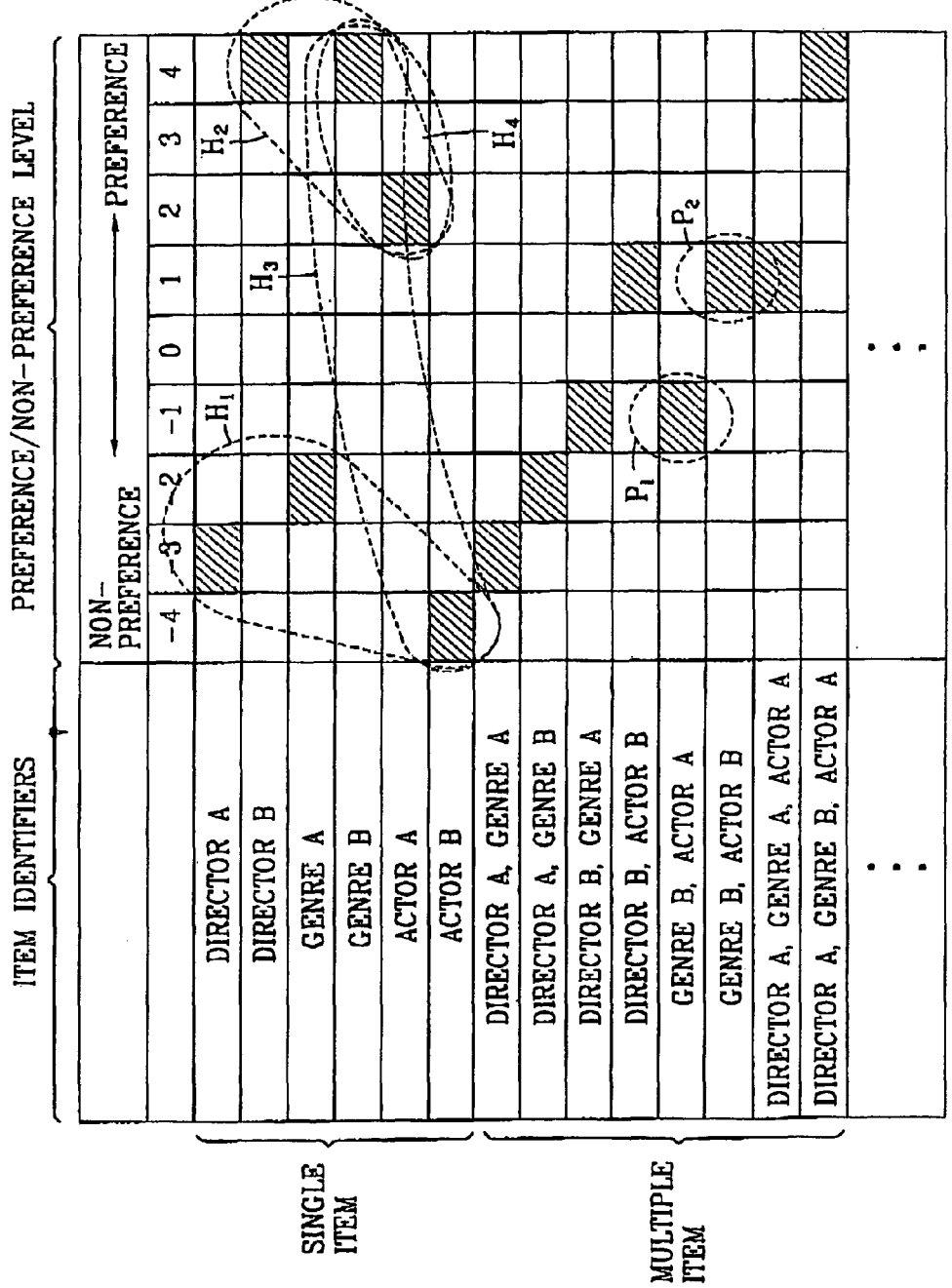

MULTIPLE ITEM USER PREFERENCE INFORMATION DATA STRUCTURE AND METHOD FOR PROVIDING MULTI-MEDIA INFORMATION

CROSS REFERENCE TO RELATED APPLICATION

The present application is a continuation of application Ser. No. 09/665,941, filed Sep. 21, 2000, the entirety of which is incorporated by reference herein.

BACKGROUND OF THE INVENTION

1. Field of the Invention

The present invention relates to a user preference information data structure and a method for providing whole or partial multi-media content using the user preference information data structure, and more particularly, to a user preference information data structure which is capable of classifying and setting user's preference Information regarding multi-media contents with multiple items to thereby provide users with user request-based whole or partial multi-media information, and a method for providing multi-media information by using the user preference information data structure.

2. Description of the Background Art

Recently, as a digital video technique and an image/video recognition technique are developed, information users can easily search a video contents or a specific segments of the video content as desired.

That is, users easily understand the whole content of a video stream within a short time by searching only a summary version generated according to user's desire, rather than viewing the whole content recorded in the video stream.

For this purpose, researches are being conducted for searching information desired by the user more easily, for which a content-based information is described to the whole or the partial segments of the multi-media stream so that the user can easily search desired information using the content-based data.

The content-based data may include a producer, a director, an actor in the whole multi-media stream or may include information related to appearance or disappearance of things in a video scene, information on when things happen, interval information of the stream such as a relationship between a character and happenings.

Accordingly, when the content-based data is described for the multi-media stream, the user may select a desired multi-media stream, or easily searches only a desired portion (or a segment) of the multi-media stream.

The method using the content-based date will now be described.

In order to satisfy the user's request that "show me only the scene in which a main actor is closed up in the movie Titanic," the video browsing system can display only the desired scene to the user on the basis of the previously described content-based data regarding the multi-media content.

U.S. Pat. No. 5,913,013 discloses a method in which a level is set for a violent scene, a nude scene or a portion of appearance of an actor in a multi-media stream and a code is given for segments, to thereby construct a content map. With this method, the user can easily search a desired portion on the basis of the content map.

However, the method for providing multi-media contents or parts of contents using the content map has a problem that whenever the user wants his or her desired information, the searching condition should be described by the user.

In order to solve the problem, most systems adopts a method that automatically recommend programs or segments of programs by combining a content map with a use user preference information.

The user preference information is stored in a non-volatile memory of a terminal device of the user or a server or in a portable non-volatile memory such as a smart card. The user preference information can be automatically learned from the usage history of the user.

In this manner, on the basis of the usage history user preference information can be updated or the user can directly edit his or her user preference information to obtain his or her desired information automatically, thereby expressing a user preference/non-preference.

The user preference/non-preference includes a genre of information such as a melodrama, an action movie, a horror movie, politics, news, economic news, soccer, etc, or general information items related to multi-media content such as producer(s), production date, director(s), characters, a degree of special effects, etc.

The user conventional preference information data structure may indicate preference or non-preference for each item (i.e., a genre of information, a producer, a production date or a director, etc.), and as shown in FIG. 1, it is general to have a preference level (or a value) for each item.

The conventional user preference information data structure can be represented as follows Pref={(I,v): I denotes a preference item v is users preference value related to item I}

FIG. 1 is a table expressing user preference information in accordance with a conventional art, in which preference/non-preference level is differently set for a single item field (i.e., each director, each genre or each actor, etc.) and each item.

FIG. 2 illustrates a construction of a user preference information data structure in accordance with a conventional art. The user preference information 100 includes a plurality (0, 1, . . . , n) of item user preference information 110. The sub-tree of the user preference information 110 includes a preference item identifier 111 for searching multi-media information or a partial portion of the multi-media information and an item preference/non-preference level 112.

The item user preference information 110 may be formed by items of a similar category, for example, a group (or a set) of preference items by genres or actors. The group (or the set) may be designed to have one-dimensional structure or a hierarchical structure.

The preference item identifier 111 includes items such as a producer, a director or an actor of the multi-media information. The item preference/non-preference level (or a value) 112 indicates the degree of preference for the preference items.

In this manner, the method recommends or provides a multi-media stream or a portion of the multi-media stream (a segment or a still image) fitting the user's taste by automatically filtering multi-media stream or its segment according to the user's preference.

However, generally, as a data format in very diverse types, and further, the content of the multi-media information also includes various genres, there are great number of items to describe the user preference information.

Accordingly, the conventional user preference information data structure formed merely with the single item and a corresponding user preference/non-preference level. But, multi-media information providing method by using the data structure of the conventional art is unsatisfactory in the aspect that since the information desired by the user is expressed merely by the single item and its corresponding preference item level, it can not fully express the user preference.

For example, in case where the user has a high preference level for each of preference item 'A' and 'B' while he or she does not prefer the content that 'A' and 'B' appear together at the same time, the user preference expressing method for the single item in accordance with the conventional art fails to fully express the user preference.

SUMMARY OF THE INVENTION

Therefore, an object of the present invention is to provide a data structure for describing multiple item user preference information data structure which is capable of classifying and setting user's preference information regarding multi-media content with multiple items to thereby provide users with user request based whole or partial multi-media information, and a method for providing multi-media information by using the user preference information data structure.

To achieve these and other advantages and in accordance with the purpose of the present invention, as embodied and broadly described herein, there is provided a multiple item user preference information data structure for multi-media contents provided from an information provider to an information user, including single item user preference information for single items related to the multi-media contents; and multiple items user preference information for multiple items formed by combining the multiple items and assigning single preference value (level).

In order to achieve the above object, there is also provided a method for providing multi-media information using the multiple item user preference information data structure to provide a multi-media contents desired by users, including the steps of: setting user preference information for the multi-media contents; searching the multi-media contents according to the user preference information; and providing users with multi-media contents according to the searching result.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a table expressing user preference information in accordance with a conventional art;

FIG. 4 is a table expressing user preference information in accordance with the present invention.

DETAILED DESCRIPTION OF THE PREFERRED EMBODIMENTS

Reference will now be made in detail to the preferred embodiments of the present invention, examples of which are illustrated in the accompanying drawings.

In order to filter and search multi-media contents, the presented data structure for describing user's preference information permits assigning single preference value(level) to the combinations of multiple user preference items, so as to provide the data structure for describing the user preference level for the multiple items and the method for providing the multi-media information by using the data structure.

The presented user preference information data structure can be represented as follows Pref={(L,v): L denotes the list of single preference items v is user's preference value for combinations of preference items in list L)

Figure 2:
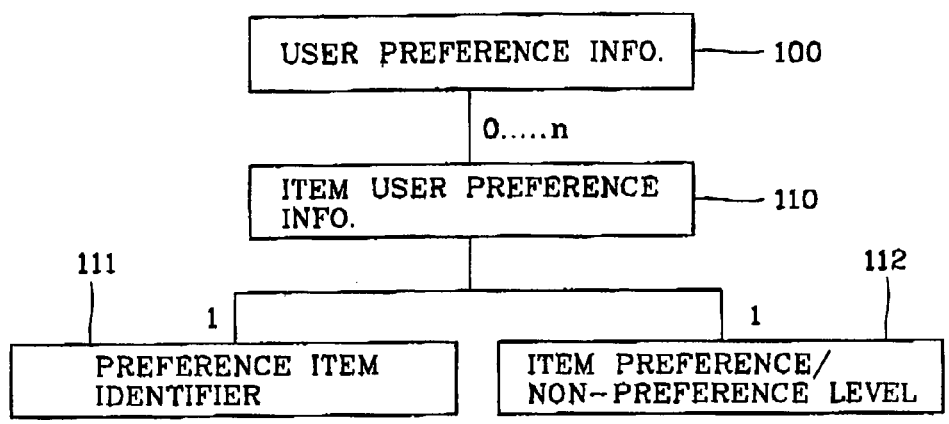
FIG. 2 illustrates a construction of a user preference information data structure in accordance with a conventional art.
Figure 3:
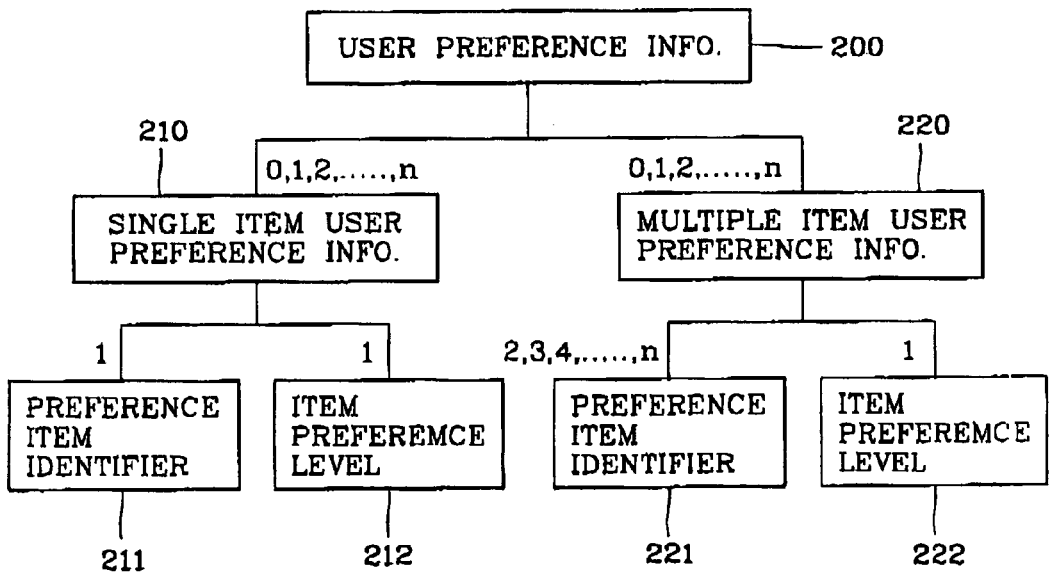
FIG. 3 illustrates a construction of a user preference information data structure in accordance with the present invention.

FIG. 3 illustrates a construction of a user preference information data structure in accordance with the present invention.

As shown in the drawing, a sub-tree of the user preference information 200 includes a plurality (0, 1, . . . , n) of single item user preference information 210 and a plurality (0, 1, . . . , n) of multiple items user preference information 220. A sub-tree of the single item user preference information 210 includes a user preference item identifier 211 and an item user preference 212 corresponding to the user preference item identifier. A sub-tree of the multiple items user preference information 220 includes a plurality (2, 3, . . . , n) of multiple items identifiers 221 and an item user preference level 222 corresponding to the multiple items identifier.

In this respect, in the sub-trees of the single item user preference information 210 and the multiple items user preference information 220, items in the similar condition form a group (or a set), which will now be described in detail with reference to FIG. 4.

FIG. 4 is a table expressing user preference information in accordance with the present invention, which includes a user preference item identifier field indicating single items and multiple items and, a user preference/non-preference level field indicating the degree of the user preference for each item.

The single items are divided into single item identifiers and its user preference levels such as a director 'A'. The multiple items are divided into several multiple items consisting of a direction 'A', a director 'B', a genre 'A' and a genre 'B' (i.e., the director 'A' and the genre 'A', the director 'A', the genre 'B', the director 'B' and the genre 'A' and the director 'B' and the genre 'B') and its user preference level.

Meanwhile, likewise in the conventional art, the user preference information may be changed using a user's access pattern or explicitly edited by the user.

That is, the user can give different weight value for the single items and the multiple items, so that user preference information suiting the user's taste can be set and thus more accurate information can be obtained.

Generally, the user preference information data structure which permits multiple items preference is able to provide more accurate information to users than the user preference permits only the single item preference. Therefore, the user preference data structure of present invention can produce more precise result than that of conventional art and the multi-media information or a portion of the multi-media information provided according to the user preference.

Therefore, by taking the method for providing multi-media information by using the data structure including the multiple items, users can receive more accurate information of desired contents automatically.

With reference to FIG. 4, the merit of the user preference information including the multiple items will now be described in detail.

As shown in the drawing, it is noted that the user has a tendency (indicated by 'H2') to prefer a movie directed by a director 'B', a movie belonging to a genre 'B' and a movie in which an actor 'A' plays, and has a tendency (indicated by 'H1') not to prefer a movie directed by a director 'A', a movie belonging to a genre 'A' and a movie in which an actor 'B'.

If the user preference information is expressed only with the single item for the user preference/non-preference according to the conventional art, it is inferred that the user would prefer a movie (indicated by 'H4') that belongs to the genre 'B' and the actor 'A' plays to a movie (indicated by 'H3') that belongs to the genre 'B' and the actor 'B' plays. But it may not be true.

That is, as shown in FIG. 4, in case that the user preference information is expressed by using the multiple items and its corresponding user preference/non-preference level, it is resulted in that the user prefers the movie (P2=H3) that belongs to the genre 'B' and the actor 'B' plays to the movie (P1=H4) that belongs to the genre 'B' and the actor 'A' plays.

Consequently, the user preference information can be more accurately recommended or provided by using the multiple items.

Though the multiple items are increased in number as the number of the single item is increased, since only the substantially critical multiple items or multiple items desired by the user are stored, and when the single items are combined to generate multiple items, some multiple items that could be hardly combined are excluded from storing, so that the memory of the system can be effectively managed.

Also, by allocating a weight value for the single items and the multiple items, the multi-media information desired by the user can be rapidly filtered and searched according to the order of priority.

As so far described, according to the multiple item user preference information data structure of a user profile and the multi-media contents filtering/searching method using the data structure of the present invention, user preference items are divided into the single items and multiple items consisting of the combination of the single items, and the user preference/non-preference information is described for the single items and for the multiple items, so that more accurate multimedia information suiting the user's taste can be used for recommending or providing to the information user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meats and bounds are therefore intended to be embraced by the appended claims.

What is claimed is:

1. A method implemented by a computer performing instructions, tangibly embodied in a computer readable medium, for processing multimedia data, the method comprising:

generating a user preference description defining a hierarchical structure to describe preferences for filtering and searching of multimedia content based on a content description identifying directors or actors for multimedia streams identified by their titles, the hierarchical structure including first and second preference elements, the first preference element explicitly identifying a single content description component and the second preference element explicitly identifying a specific combination of a plurality of content description components, wherein each of at least two content description components in the specific combination specifies a corresponding director or actor without reference to any of the titles, and wherein the user preference description specifies a first preference value for the first preference element and a second preference value for the second preference element, the first preference value characterizing user preference for the single description component and the second preference value providing a single value characterizing user preference for the specific combination of the plurality of content description components, wherein the second preference value is set using explicit user input or a user's access pattern to multimedia content; and using the user preference description to filter or search for preferred content in the multimedia streams.

2. The method of claim 1, wherein the plurality of content description components identified by the second preference element includes the single content description component identified by the first preference element.

3. The method of claim 2, wherein the second preference value is independent from the first preference value.

4. The method of claim 1, wherein using the preference description to filter or search for the multimedia content includes using the first and second preference values as relative weights of the first and second preference elements for searching or filtering of the multimedia content.

5. The method of claim 1, wherein each of the first and second preference values is selected from a range including negative and positive values, the negative values indicating non-preference and the positive values indicating preference.

6. The method of claim 1, further comprising:
storing the user preference description in a non-volatile memory.

7. The method of claim 6, wherein the non-volatile memory includes a portable non-volatile memory.

8. A computer program product, tangibly embodied in a computer readable medium, for processing multimedia data, the computer program comprising instructions to cause data processing apparatus to perform operations, comprising:

generating a user preference description defining a hierarchical structure to describe preferences for filtering and searching of multimedia content based on a content description identifying directors or actors for multimedia streams identified by their titles, the hierarchical structure including first and second preference elements, the first preference element explicitly identifying a single content description component and the second preference element explicitly identifying a specific combination of a plurality of content description components, wherein each of at least two content description components in the specified combination specifies a corresponding director or actor without reference to any of the titles, and wherein the user preference description specifies a first preference value for the first preference element and a second preference value for the second preference element, the first preference value characterizing user preference for the single description component and the second preference value providing a single value characterizing user preference for the specific combination of the plurality of content description components, wherein the second preference value is set using explicit user input or a user's access pattern to multimedia content; and using the user preference description to filter or search for preferred content in the multimedia streams.

9. The product of claim 8, wherein the plurality of content description components identified by the second preference element includes the single content description component identified by the first preference element.

10. The product of claim 9, wherein the second preference value is independent from the first preference value.

11. The product of claim 8, wherein using the preference description to filter or search for the multimedia content includes using the first and second preference values as relative weights of the first and second preference elements for searching or filtering of the multimedia content.

12. The product of claim 8, wherein each of the first and second preference values is selected from a range including negative and positive values, the negative values indicating non-preference and the positive values indicating preference.

13. The product of claim 8, the computer program further comprising instructions to cause data processing apparatus to perform operations comprising:
   storing the user preference description in a non-volatile memory.

14. The product of claim 13, wherein the non-volatile memory includes a portable non-volatile memory.

15. A system for processing multimedia data, the system comprising:
   a data storage device storing a user preference description defining a hierarchical structure to describe preferences for filtering and searching of multimedia content based on a content description identifying directors or actors for multimedia streams identified by their titles, the hierarchical structure including first and second preference elements, the first preference element explicitly identifying a single content description component and the second preference element explicitly identifying a specific combination of a plurality of content description components, wherein each of at least two content description components in the specified combination specifies a corresponding director or actor without reference to any of the titles, and wherein the user preference description specifies a first preference value for the first preference element and a second preference value for the second preference element, the first preference value characterizing user preference for the single description component and the second preference value providing a single value characterizing user preference for the specific combination of the plurality of content description components, wherein the second preference value is set using explicit user input or a user's access pattern to multimedia content; and
   data processing apparatus configured to perform operations comprising:
      generating the user preference description stored at the data storage device; and
      using the user preference description to filter or search for preferred content in the multimedia streams.

16. The system of claim 15, wherein the plurality of content description components identified by the second preference element includes the single content description component identified by the first preference element.

17. The system of claim 16, wherein the second preference value is independent from the first preference value.

18. The system of claim 15, wherein using the preference description to filter or search for the multimedia content includes using the first and second preference values as relative weights of the first and second preference elements for searching or filtering of the multimedia content.

19. The system of claim 15, wherein each of the first and second preference values is selected from a range including negative and positive values, the negative values indicating non-preference and the positive values indicating preference.

20. The system of claim 15, wherein the data storage device stores the user preference description in a non-volatile memory.

21. The system of claim 20, wherein the non-volatile memory includes a portable non-volatile memory.

* * * * *